United States Patent Office 3,597,381
Patented Aug. 3, 1971

3,597,381
COLOR STABILIZED AQUEOUS DISPERSIONS OF IMINATED VINYL ADDITION POLYMERS AND PROCESS FOR PREPARING SAME
Robert A. Ripley, Ottawa, Ontario, Canada, assignor to E. I. du Pont de Nemours and Company, Wilmington, Del.
No Drawing. Continuation-in-part of application Ser. No. 637,084, May 9, 1967. This application Jan. 21, 1970, Ser. No. 4,780
Int. Cl. C08f 37/00, 37/14
U.S. Cl. 260—29.6HN
13 Claims

ABSTRACT OF THE DISCLOSURE

Aqueous dispersions of iminated vinyl addition polymers containing small amounts of an ammonia derivative compound, such as hydroxylamine hydrochloride, hydrazines, semicarbazides, and their derivatives, exhibit improved color stability.

CROSS REFERENCE TO RELATED APPLICATIONS

This application is a continuation-in-part of pending application Ser. No. 637,084, filed May 9, 1967 and now abandoned.

BACKGROUND OF THE INVENTION

Field of the invention

This invention relates to color stabilized aqueous dispersions of carboxylic ploymers which have been iminated by reacting the pendant carboxylic acid groups or salts thereof with an aziridine compound. The dispersions are stabilized against objectionable color formation by addition of an ammonia derivative compound either prior to or after imination of the carboxylic polymer.

The carboxylic polymesr are substantially water-insoluble copolymers containing pendant carboxyl groups (—COOH) or their salts (e.g., —COOK). These copolymers are products of at least one monomer containing both polymerizable olefinic unsaturation and a carboxylic acid group (or an equivalent source of carboxyl groups) with at least one other copolymerizable monomer, e.g., a vinyl ester, such as vinyl acetate, and preferably including an other copolymerizable monomer, e.g., ethylene.

In forming the iminated polymers, the carboxylic polymer is reacted with an aziridine compound. The aziridine compound is commonly referred to as an alkylene imine and has the formula:

Formula A

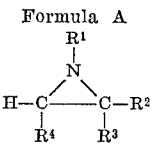

wherein:

$R^1$ is hydrogen, benzyl or a $C_1$ to $C_5$ alkyl radical, and is preferably hydrogen or a $C_1$ to $C_4$ alkyl radical;
$R^2$ and $R^3$ are selected individually from the group consisting of hydrogen, benzyl, aryl and $C_1$ to $C_5$ alkyl radicals; and
$R^4$ is hydrogen or a $C_1$ to $C_5$ alkyl radical.

DESCRIPTION OF THE PRIOR ART

Iminated carboxylic polymers are well known in the art and can be used in paint formulations to give paints with improved freeze-thaw stability, durability, and adhesion to wet and dry substrates. Dispersions of these polymers and processes for their preparation are disclosed in U.S. Pats. 3,261,796; 3,261,797; and 3,282,879. The last-mentioned patent describes a process for removing residual dark color resulting from the treatment of a carboxylic polymer containing vinyl acetate units with an alkylene imine by treating the polymeric dispersion with a water soluble bisulfite salt.

SUMMARY OF THE INVENTION

The aqueous dispersions of this invention are comprised of an iminated carboxylic polymer containing vinyl ester units and a color stabilizing amount of an ammonia derivative, preferably 0.2–1.0 percent by weight of hydrazine, based on the weight of the carboxylic polymer. The iminated polymer has attached to the carbon atoms of the polymer backbone monovalent radicals of the formula

aminoester radicals of the formula

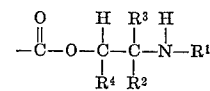

and hydroxyamide radicals of the formula

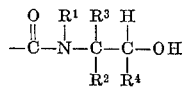

In the formulas $R^1$ is hydrogen, benzyl or a $C_1$ to $C_5$ alkyl radical. $R^2$ and $R^3$ are selected individually from the group consisting of hydrogen, benzyl, aryl and a $C_1$ to $C_5$ alkyl radical. $R^4$ is hydrogen or a $C_1$ to $C_5$ alkyl radical. Preferably $R^1$, $R^3$ and $R^4$ are hydrogen and $R^2$ is hydrogen or methyl. The carboxylic polymer contains from about 0.2% to 15% by weight of acid units. In the imination of the polymer, preferably sufficient alkylene imine is used to theoretically react with all of the acid units.

DESCRIPTION OF THE INVENTION

In its broadest aspect the present invention is applicable to a wide variety of carboxylic polymers. In addition to the carboxylic polymers disclosed in the aforementioned U.S. Pat. 3,282,879, the present invention is applicable to carboxylic polymers containing vinyl esters other than vinyl acetate and to carboxylic polymers containing widely differing amounts of vinyl ester units. Consequently, beneficial use of the present invention in stabilizing carboxylic polymer dispersions can be obtained with carboxylic polymers having from about 10 to 99.8 percent by weight of polymerized vinyl ester units, 0 to 89.8 percent by weight of polymerized units of a second polymerizable non-carboxylic monomer, and from about 0.2 to 15 percent by weight of polymerized units of an olefinically unsaturated carboxylic acid.

While the previous discussion sets forth a broad range of polymers which are useful in the present invention, the dispersion color stability obtainable in the present invention is particularly suitable to those carboxylic polymers which, after imination, are to be used as binders in paint formulation. Such carboxylic polymers usually contain about 80 to 95 weight percent polymerized vinyl ester, 1 to 18 weight percent polymerized ethylene, and 0.3 to 6 weight percent polymerized olefinically unsaturated carboxylic acid. Preferably, such carboxylic polymers contain 84 to 92 weight percent vinyl ester, up to 14 weight percent polymerized ethylene, and 1.4 to 3 weight percent unsaturated carboxylic acid.

While vinyl acetate is the preferred vinyl ester monomer, other vinyl esters of lower carboxylic acids, such as vinyl formate, vinyl propionate and vinyl butyrate, can also be used. As indicated by U.S. Pat. 3,282,879, the carboxylic acid monomer can be selected from a wide variety of olefinically unsaturated carboxylic acids. Particularly preferred among these is acrylic acid since the carboxylic acid polymer prepared is especially compositionally homogeneous. However, many other unsaturated carboxylic acids are operable as well. Illustrative of some of these are monocarboxylic acids, such as methacrylic acid and crotonic acid; and dicarboxylic acids, such as itaconic acid, maleic acid, and fumaric acid. Also, mixtures of the above acids, as well as the half esters of dicarboxylic acids, such as methylhydrogen maleate can be used.

As indicated above, the carboxylic polymers useful in the present invention can contain units of polymerizable monomers other than the vinyl ester and carboxylic acid. The improved color stability of the present invention is not limited by the selection of this monomer, and its choice will largely be determined by the end use application of the polymer. While, as indicated previously, in paint formulations ethylene is preferred, other monomers, such as ethyl acrylate, 2-ethylhexyl acrylate, and vinyl versatate are also useful. Frequently, even when using ethylene, it may be desirable to replace a portion of its content with one or more of the above monomers.

Techniques of preparing carboxylic polymers along with disclosures of useful surfactant systems, catalysts, buffering agents, and other ingredients are set forth in the aforementioned U.S. Pat. 3,282,879. More particularly, when carboxylic polymers containing polymerized ethylene are prepared, the polymerization is carried out in an emulsion in a closed vessel under an ethylene pressure sufficient to introduce the desired amount of ethylene into the polymer. In general, pressures on the order of about 150 p.s.i. to about 1,000 p.s.i. are employed, the higher pressures being used when larger amounts of ethylene are to be introduced into the polymer. Both continuous and batch polymerization techniques are known to be useful in preparing carboxylic polymers. In continuous polymerization techniques, polymerization temperatures generally range from about 80° C. up to as high as about 115° C. On the other hand, for batch polymerizations, the temperatures generally range from about 20° C. to about 100° C. and preferably between about 60° C. and 90° C.

The carboxylic polymer is produced in any molecular weight that is desired. Usually the molecular weight is above 100,000 for polymers used as binders in paint formulations, but even molecular weights of about a million and above are frequently used.

The iminated polymer is conveniently prepared by reacting the carboxylic polymer in an emulsion with an aziridine compound (alkylene imine) of Formula A above. Ethylenimine (Formula B) and propylenimine (Formula C) are particularly preferred aziridines, because of their relatively low cost and plentiful supply.

Formula B 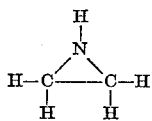

Formula C 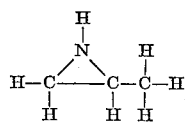

The aziridine compound is added to the carboxylic polymer emulsion in an amount equal to about 10 to 200 percent of the theoretical amount required to react with all the pendant carboxyl groups of the carboxylic polymer but preferably about the theoretical stoichiometric amount is used. When the aziridine compound is added to the carboxylic polymer latex, some hydrolysis of the aziridine compound occurs; therefore, the iminated latex also contains a small amount of the hydrolysis products of the aziridine compound. It has been found that the stability of the iminated polymer dispersion that results from the imination reaction tends to be enhanced by the presence of small amounts of unreacted carboxyl groups; however, this is not essential in obtaining the particular color stability of the present invention.

As illustrated in the aforementioned U.S. Pat. 3,282,879, a typical procedure for carrying out the imination reaction comprises mixing the aziridine compound in a reaction vessel with a carboxylic polymer dispersion containing about 0.5 to 10 percent of an anionic surfactant based on polymer weight. Preferably, the mixture is reacted at about 40 to 75° C. until imination is completed (e.g., about ½ hour at the higher temperature to about 12 hours at the lower temperature), and finally the reaction product is cooled to room temperature. In order to avoid emulsion coagulation and insure good color stability according to this invention, imination temperatures in excess of 80° C. are ordinarily avoided. The entire reaction can be carried out at room temperature, but heating is generally preferred because of the shorter reaction time.

The color stable dispersions of the present invention are prepared by adding an ammonia derivative such as hydrazine to dispersions of the above-described carboxylic polymers, the addition preferably being made prior to the time at which the polymer is iminated. While the ammonia derivative addition can be made after imination, the maximum dispersion color stability of this invention is obtained by addition prior to imination. The amount of ammonia derivative addition used in the present invention is that necessary to ensure dispersion color stability. Since this in turn depends on the amount of unpolymerized vinyl ester and aldehyde in the carboxylic polymer dispersion, no exact amount, optimum under all polymerization conditions, can be readily specified. For example, if after polymerization, the polymer dispersion is stripped of residual monomer, lesser amounts of ammonia derivative would be required to ensure dispersion color stability than if the polymer dispersion were not so stripped. However, with most polymerization techniques wherein polymerization is intended to go substantially to completion (0.2–1 weight percent residual vinyl ester monomer) and no subsequent stripping step is involved, amounts of hydrazine in excess of about 1.0 weight percent, based on the polymer weight, are ordinarily not required. Preferably, in such circumstances, hydrazine in an amount of about 0.2–0.8 weight percent is used. Correspondingly, other ammonia derivatives are used in amounts so as to give equivalent functionality to that of hydrazine in the dispersion. For example, the weight percent of unsymmetrical dimethylhydrazine (M.W. 60) required in order to give equivalent functionality to that of hydrazine (M.W 32) would be about $$3.75 \text{ times } \left(\frac{60}{32} \times 2\right)$$

as great as that required for hydrazine.

In general, the most useful ammonia derivative is hydrazine, however, hydroxylamine and other selected ammonia derivatives having two free hydrogen atoms bonded to a nitrogen atom are also useful. Examples of useful classes of ammonia derivatives are: mono-alkyl substituted hydrazines, unsymmetrical di-alkyl substituted hydrazines, alkylene substituted hydrazines, primary alkyl amines, and semi-carbazides. Particularly useful ammonia derivatives are those having the following structural formula:

$$H_2N-R_1$$

wherein:

$R_1$ can be —OH, $C_1$–$C_5$ alkyl or

$R_2$ and $R_3$ can together be a divalent alkylene radical having less than about seven carbon atoms or individually be —H or $C_1$–$C_5$ alkyl (including straight chain and branched) or when $R_2$ is —H, $R_3$ can be

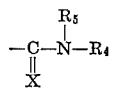

with X being O or S and $R_4$ and $R_5$ generally being —H, though they can be other substituents such as alkyls or aryls.

Salts of the ammonia derivative, such as the hydrochloride can also be used. Among the most useful and readily available ammonia derivatives are hydroxylamine hydrochloride, hydrazine, semicarbazide hydrochloride, thiosemicarbazide, and unsymmetrical dimethylhydrazine. Of these, hydrazine is particularly preferred.

While the pH of the carboxylic polymer dispersion is not particularly limited in achieving color stability according to the present invention, frequently there is a pH limitation in the application for which the dispersion is to be used. Since the iminated polymers in this invention are especially useful as binders in paint formulations, dispersions having a pH of between about 3 and 10 are ordinarily prepared.

To prepare a paint formulation, any of the ordinary water-insoluble inorganic and organic paint pigments well known in the art can be mixed with the iminated dispersions containing the substituted amines. However, the relative amount and type of pigment in the formulation has significant effect on the properties of the paint. A pigment volume concentration of about 10% is about the minimum proportion of pigment which will provide a paint which has a practical hiding power. The maximum proportion of pigment volume concentration is about 70%. Preferably, however, a pigment volume concentration in the range of 25–65% is desirable. Pigment volume concentration is the ratio expressed on a percent basis of the volume of pigment to the total volume of pigment plus film forming materials of the compositions; the "volume of pigment" is the volume of vehicle displaced by the pigment wet with vehicle.

Table 1 were started. The temperature was held at 87–92° C. and the ethylene pressure at 400 p.s.i.g. during the continuous feed period of 91 minutes. When the feeds were completed, the reaction mixture was maintained at 88–92° C. for 30 minutes, then cooled and discharged.

TABLE 1

|  | Initial charge, pounds | Continuous feeds, pounds | |
|---|---|---|---|
|  |  | Surfactant and initiator [1] | Monomers [2] |
| "Gafac" RE-960 [4] | 0.51 | 2.03 |  |
| "Gafac" RE-610 [4] | 0.22 | 0.87 |  |
| Potassium hydroxide | 0.14 | 0.58 |  |
| Ammonium persulfate | 0.34 | 0.11 |  |
| Water | 49.7 | 28.3 |  |
| Vinyl acetate | 1.7 |  | [3] 75 |
| Acrylic acid |  |  | 1.5 |

[1] At a constant rate of 0.35 pound/minute.
[2] At a constant rate of 0.85 pound/minute.
[3] Only vinyl acetate added for the first 9 minutes.
[4] Trade name for General Aniline and Film Corp.'s anionic surfactants composed of complex phosphate esters.

The dispersion obtained was found to have a solid content of 53.4% and a vinyl acetate monomer content of 0.66%. Separate samples of the dispersion were prepared and the reagents set forth in Table 2 were added with stirring at room temperature at a level of 0.0094 mole per 100 grams of dispersion. After addition of the reagents, ethylenimine which was diluted 1:1 with water, was added to the samples in an amount equivalent to the molar acid content of the copolymer in the dispersion. The addition was made with stirring during a five minute period at a temperature of 55° C. The temperature was held at 55° C. and stirring was continued for 30 minutes after which the dispersion was cooled to room temperature.

The "Yellowness Index" of each of the final samples was measured initially, after storage for one week at 25° C. and after storage in an oven at 60° C. for one week using a "Colormaster" Differential Colorimeter according to ASTM D1925–63T. The results obtained are reported in Table 2 which follows:

TABLE 2

| Reagent | Weight added, grams | Weight percent ammonia derivative | | Yellowness index | | |
|---|---|---|---|---|---|---|
|  |  | Based on polymer | Based on dispersion | Initial | After 1 week at— | |
|  |  |  |  |  | 25° C. | 60° C. |
| None—Control [1] |  |  |  | 0.0 | 0.12 | 1.85 |
| None—Control [2] |  |  |  | 17.4 | 31.4 | 30.8 |
| Semicarbazide hydrochloride | 5.4 | 2.1 | 1.08 | 2.7 | 3.0 | 6.1 |
| Thiosemicarbzaide | 4.3 | 1.7 | .86 | 4.8 | 4.6 | 7.8 |
| Hydrazine | 1.5 | .59 | .3 | 2.5 | 2.9 | 10.8 |
| Dimethylhydrzaine | 2.8 | 1.1 | .56 | 3.1 | 5.4 | 11.0 |

[1] Non-iminated.
[2] Iminated.

The following examples illustrate the invention. All parts and percentages are by weight, unless otherwise indicated.

EXAMPLE I

An aqueous dispersion of a copolymer containing 85.2% of vinyl acetate, 13.1% ethylene and 1.7% acrylic acid was prepared in a 20-gallon autoclave equipped with an agitator, one gas and two liquid feed lines, temperature and pressure recording devices and a heat exchanger through which the dispersion was circulated for cooling. The autoclave was first purged with nitrogen and then with ethylene. The initial charge, whose composition is indicated in Table 1 which follows, was added in two streams, one containing vinyl acetate and the other the remaining ingredients as an aqueous solution. The agitator was started, and the reactor was pressured with ethylene to 240 p.s.i.g. The temperature was raised to 84° C. over a 45-minute period. The ethylene pressure was then raised to 400 p.s.i.g. and the continuous feeds set forth in From the data set forth in the table, it will be noted that addition of a reagent in accordance with the teaching of this invention substantially stabilizes the iminated polymeric dispersions against color formation.

EXAMPLE II

An aqueous dispersion of a copolymer containing 85.7% vinyl acetate, 12.6% ethylene and 1.7% acrylic acid and having a solid content of 54.6% was prepared as described in Example I. Analysis of the dispersion showed it to contain 0.4% vinyl acetate monomer and 0.1% acetaldehyde. Thirty-five percent aqueous hydrazine was added with stirring to samples of the dispersion at room temperature to give 0.18%, 0.37%, 0.92% hydrazine based on the polymer weight. The samples were iminated and color measurements made as described in Example I. Adhesion to southern yellow pin was determined by brushing one coat of the dispersion onto sanded panels and drying them for 2 to 7 days at 73° F. and 50% relative humidity. The panels were then immersed in water at 77° F. face down for 24 hours, removed, dried by blotting off the excess water, and cross-hatched with a razor blade to give 100 small squares. A ¾-inch strip of "Scotch" masking tape was applied to the cross-hatched surface and then rapidly removed by pulling at a right angle to the surface.

A graduated rating scale with removal of none of the coating being rated 10 and complete removal 0 was used in evaluating adhesion. The results obtained are set forth in Table 3 which follows:

TABLE 3

| Sample number | Percent hydrazine based on polymer | Yellowness index | | Adhesion to wet wood |
|---|---|---|---|---|
| | | After 2 days at 25° C. | After 7 days at 60° C. | |
| 1 | 0 | 25.3 | 27.7 | 8 |
| 2 | 0.18 | 3.9 | 11.2 | 10 |
| 3 | 0.37 | 2.4 | 6.2 | 10 |
| 4 | 0.92 | −0.9 | 4.1 | 9 |

EXAMPLE III

The polymerization process of Example I was repeated to give an aqueous dispersion of a copolymer containing 85.5% vinyl acetate, 12.5% ethylene and 2% methacrylic acid and having a solids content of 53.5%. Aqueous hydrazine was added to samples of the dispersion which contained 0.92% vinyl acetate monomer to give 0.4, 0.6 and 0.8% hydrazine. The hydrazine-containing samples and an additional sample to which no hydrazine had been added were iminated as described in Example I. Hydrazine was then added to the additional sample to give 0.4% hydrazine. The "Yellowness Indexes" of the dispersion and of 5 mil films were prepared by spreading the dispersions uniformly on glass plates and allowing them to dry at room temperature, and the adhesion values were determined by the methods previously described. The results obtained are set forth in Table 4 which follows:

TABLE 4

| Sample No. | Percent hydrazine based on polymer | Dispersion yellowness index | | Film yellowness index | | Adhesion to wet wood |
|---|---|---|---|---|---|---|
| | | Initial | After 7 days at 60°C. | Initial | After 10 min. at 150° C. | |
| 1 | 0 | 29.4 | 34.8 | 31.3 | 54.7 | 9 |
| 2 | ¹0.4 | 15.4 | 33.2 | 10.1 | 21.8 | 9 |
| 3 | 0.4 | 10.2 | 32.5 | 4.8 | 22.6 | 9 |
| 4 | 0.6 | 2.8 | 14.4 | −0.8 | 11.7 | 8 |
| 5 | 0.8 | 2.6 | 10.3 | −1.0 | 5.1 | 8 |

¹ Hydrazine added after imination.

EXAMPLE IV

An aqueous copolymer dispersion was prepared by first forming the following dispersion of a carboxylic polymer having vinyl acetate units:

Portion 1:                                            Parts by weight
  A solution of 8 parts sodium lauryl sulfate
    dissolved in 21 parts water _____  29
Portion 2:
  Vinyl acetate monomer _____ 576
  2-ethylhexyl acrylate monomer _____ 192
  Crotonic acid solution (90% aqueous solution) _____  35
Portion 3:
  Water _____ 78.85
  Potassium persulfate _____  4.15
                                                      ———
                                                      915.00

Each portion was premixed before it was added. Portion 1 was charged into a conventional polymerization vessel equipped with stirrer, thermometer, condenser, and means to introduce nitrogen and reagents. The polymerization reaction was carried out as follows under nitrogen. Portion 1 was heated to 80° C., 10% of Portion 2 and about 40% of Portion 3 were added simultaneously with stirring and while keeping the contents of the vessel at about 80° C. The remainder of Portion 2 and about 50% of Portion 3 were added gradually and simultaneously over a period of 3 hours while keeping the contents of the vessel at about 80° C. Then the remainder of Portion 3 was added while the temperature of the mixture was maintained at about 80° C. for 30 minutes. The resulting carboxylic polymer dispersion was cooled to 25° C. and filtered through cheesecloth to remove any coarse coagulum that was formed.

The resulting dispersion had a 54% solids content and had a polymer composition of 72:24:4 of vinyl acetate: 2-ethylhexyl acrylate:crotonic acid.

Dispersion A formulation

A reaction vessel equipped with stirrer, thermometer, condenser and addition funnel was charged with 500 parts of the above carboxylic polymer dispersion and the contents heated to about 45° C. About 4.3 parts ethylenimine was added gradually with continuous stirring and the mixture held at 45° C. for about 30 minutes. The resulting iminated carboxylic dispersion was cooled to room temperature. After standing about 12 hours, the dispersion turned a dark coffee brown color. Paints formulated from this dark colored dispersion contained an undesirable dark tint even when heavily pigmented.

Dispersion B formulation

A reaction vessel equipped with stirrer, thermometer, condenser and addition funnel was charged with 400 parts of the above carboxylic polymer dispersion and the contents heated to about 45° C. About 4.5 parts of a 35% aqueous solution of hydrazine were gradually added with continuous stirring. Then about 3.4 parts of ethylenimine were gradually added with continuous stirring and the mixture was held at 45° C. for approximately 30 minutes. This iminated polymer dispersion remained white after several days at room temperature.

EXAMPLE V

Example IV was repeated except propylenimine was substituted for ethylenimine in preparing the iminated polymer dispersions. The iminated polymer dispersion containing the hydrazine remained white after standing for several days whereas the untreated dispersion discolored after standing 12 hours.

What is claimed is:

1. An aqueous dispersion having combined therein (I) a color stabilizing amount of an ammonia derivative compound having two free hydrogen atoms bonded to a nitrogen atom reacted with residual vinyl ester and aldehyde thereby reducing color formation, said ammonia derivative being selected from hydrazine, monoalkyl substituted hydrazines, unsymmetrical di-alkyl substituted hydrazines, alkylene substituted hydrazines, and semicarbazides, and (II) an iminated vinyl addition polymer of (a) about 10 to 99.8 percent by weight polymerized units of a vinyl ester of a lower carboxylic acid, (b) about 0 to 89.8 percent by weight of polymerized units of another non-carboxylic monomer, and (c) about 0.2 to 15 percent by weight of polymerized units of an olefinically unsaturated carboxylic acid, said polymer being iminated by reacting the carboxylic caid units of the polymer with an alkylene imine and said ammonium derivative being present in an amount not in excess of that equivalent to 1 weight percent hydrazine, based on the weight of the iminated vinyl addition polymer.

2. The dispersion of claim 1 wherein the iminated vinyl addition polymer contains about 80–95 weight percent (a), about 1–18 weight percent (b), and 0.3–6 weight percent (c).

3. The dispersion of claim 2 wherein the ammonia derivative is selected from hydrazine, semicarbazide hydrochloride, thiosemicarbazide, and unsymmetrical dimethylhydrazine.

4. The dispersion of claim 3 wherein in the iminated vinyl additional polymer (a) is polymerized vinyl acetate, (b) is polymerized ethylene, and (c) is polymerized acrylic acid, methacrylic acid, or crotonic acid.

5. The dispersion of claim 4 wherein the iminated vinyl addition polymer contains 84–92 weight percent polymerized vinyl acetate, up to 14 weight percent polymerized ethylene, and 1.4–3 weight percent polymerized acrylic acid, and the ammonia derivative is present in an amount equivalent to 0.2–0.8 weight percent hydrazine, based on the weight of the iminated vinyl addition polymer.

6. The dispersion of claim 5 wherein the ammonia derivative is hydrazine.

7. A paint formulation comprising the dispersion of claim 2 having additionally dispersed therein a paint pigment in an amount such that the pigment volume concentration is 10–70 percent.

8. In the process of preparing an aqueous dispersion of an iminated vinyl addition polymer comprising preparing a vinyl addition polymer of (a) about 10 to 99.8 percent by weight polymerized units of a vinyl ester of a lower carboxylic acid, (b) about 0 to 89.8 percent by weight of polymerized units of another non-carboxylic monomer, and (c) about 0.2 to 15 percent by weight of polymerized units of an olefinically unsaturated carboxylic acid and iminating said polymer in the aqueous dispersion by reacting the carboxylic acid units of the polymer with an alkylene imine, said dispersion containing residual vinyl ester and aldehyde; the improvement comprising adding to the aqueous dispersion after the preparation of the vinyl addition polymer and reacting with such residual vinyl ester and aldehyde a color stabilizing amount of an ammonia derivative compound having two free hydrogen atoms bonded to a nitrogen atom, said ammonia derivative being selected from hydrazine, monoalkyl substituted hydrazines, unsymmetrical di-alkyl substituted hydrazines, alkylene substituted hydrazines, and semicarbazides and being added in an amount not in excess of that equivalent to 1 weight percent hydrazine, based on the weight to the iminated vinyl addition polymer.

9. The process of claim wherein the addition of the ammonia derivative is accomplished prior to the imination reaction.

10. The process comprising preparing a vinyl addition of (a) about 10 to 99.8 percent by weight polymerized units of a vinyl ester of a lower carboxylic acid, (b) about other noncarboxylic monomer, and about 0.2 to 15 percent by weight of polymerized units of an olefinically unsaturated carboxylic acid in an aqueous dispersion, said dispersion containing residual vinyl ester and aldehyde, adding to said dispersion of the vinyl addition polymer and reacting with the residual vinyl ester and aldehyde a color stabilizing amount of an ammonia derivative compound having two free hydrogen atoms bonded to a nitrogen atom, said ammonia derivative being selected from hydrazine monoalkyl substituted hydrazines, unsymmetrical dialkyl substituted hydrazines, alkylene substituted hydrazines, and semicarbazides and being added in an amount not in excess of that equivalent to 1 weight percent hydrazine, based on the weight to the iminated vinyl addition polymer, and thereafter iminating said vinyl addition polymer by reacting, in the dispersion, the carboxylic acid units of the polymer with an alkylene imine.

11. The process of claim 10 wherein the ammonia derivative is selected from hydrazine, semicarbazide hydrochloride, thiosemicarbazide, and unsymmetrical dimethyl hydrazine.

12. The process of claim 11 wherein the iminated vinyl addition polymer contains 84–92 weight percent polymerized vinyl acetate, up to 14 weight percent polymerized ethylene, and 1.4–3 weight percent polymerized acrylic acid, and the ammonia derivative is added in an amount equivalent to 0.2–0.8 weight percent hydrazine, based on the weight of the iminated vinyl addition polymer.

13. The process of claim 12 wherein the ammonia derivative is hydrazine.

References Cited

UNITED STATES PATENTS

| | | |
|---|---|---|
| 2,731,434 | 1/1956 | Johnson et al. |
| 2,821,519 | 1/1958 | Glickman. |
| 3,243,459 | 3/1966 | O'Shea. |
| 3,261,796 | 7/1966 | Simms. |
| 3,261,797 | 7/1966 | McDowell et al. |
| 3,261,799 | 7/1966 | Vermont. |
| 3,282,879 | 11/1966 | Werner. |
| 3,309,331 | 3/1967 | McDowell et al. |
| 3,314,914 | 4/1967 | Suling et al. |

FOREIGN PATENTS

| | | |
|---|---|---|
| 150,313 | 2/1953 | Australia. |

MELVIN GOLDSTEIN, Primary Examiner

U.S. CL. X.R.

260—29.6 MN

PO-1050
(5/69)

UNITED STATES PATENT OFFICE
CERTIFICATE OF CORRECTION

Patent No. 3,597,381  Dated August 3, 1971

Inventor(s) Robert A. Ripley

It is certified that error appears in the above-identified patent and that said Letters Patent are hereby corrected as shown below:

Column 1, line 38, "polymesr" should be -- polymers --; column 1, line 47 "an other" should be -- another --. Column 3, line 70, "accurs" should be -- occurs --; column 3, line 75, "amouns" should be -- amounts --. Column 6, line 72 "pin" should be -- pine --. Column 8, line 73, "caid" should be -- acid --. Column 9, line 51, after "claim" add -- 8 --. Column 10, line 3, after "about" add -- 0 to 89.8 percent by weight of polymerized units of an- --; column 10, line 4, after "and" add -- (c) --.

Signed and sealed this 21st day of March 1972.

(SEAL)
Attest:

EDWARD M.FLETCHER,JR.         ROBERT GOTTSCHALK
Attesting Officer              Commissioner of Patents